United States Patent
Moriuchi et al.

(10) Patent No.: US 10,328,416 B2
(45) Date of Patent: Jun. 25, 2019

(54) FUEL REFORMING CATALYST

(71) Applicants: Mitsui Mining & Smelting Co., Ltd., Tokyo (JP); HONDA MOTOR CO., LTD., Tokyo (JP)

(72) Inventors: Seiji Moriuchi, Saitama (JP); Kazuya Kinoshita, Saitama (JP); Yunosuke Nakahara, Saitama (JP); Keiji Tsukamoto, Saitama (JP); Kazuyuki Yamada, Saitama (JP); Hideo Urata, Saitama (JP)

(73) Assignees: Mitsui Mining & Smelting Co., Ltd., Tokyo (JP); HONDA MOTOR CO., LTD., Tokyo (JP)

( * ) Notice: Subject to any disclaimer, the term of this patent is extended or adjusted under 35 U.S.C. 154(b) by 405 days.

(21) Appl. No.: 15/117,104

(22) PCT Filed: Nov. 19, 2014

(86) PCT No.: PCT/JP2014/080638
§ 371 (c)(1),
(2) Date: Aug. 5, 2016

(87) PCT Pub. No.: WO2015/118750
PCT Pub. Date: Aug. 13, 2015

(65) Prior Publication Data
US 2017/0165642 A1    Jun. 15, 2017

(30) Foreign Application Priority Data
Feb. 5, 2014   (JP) ................. 2014-020577

(51) Int. Cl.
*B01J 23/10* (2006.01)
*B01J 23/63* (2006.01)
(Continued)

(52) U.S. Cl.
CPC ............... *B01J 23/10* (2013.01); *B01J 21/04* (2013.01); *B01J 21/066* (2013.01); *B01J 23/42* (2013.01);
(Continued)

(58) Field of Classification Search
CPC .. B01J 35/0073; B01J 35/002; B01J 35/0023; B01J 35/0026; B01J 35/08;
(Continued)

(56) References Cited

U.S. PATENT DOCUMENTS 6,409,939 B1 * 6/2002 Abdo ................ B01J 23/462
                                                      252/373
2005/0176580 A1   8/2005 Osaka
(Continued)

FOREIGN PATENT DOCUMENTS

CN        1921937 A      2/2007
CN       101204656 A     6/2008
(Continued)

OTHER PUBLICATIONS

JP2004-322001, Osaka et al, machine translation.*
(Continued)

*Primary Examiner* — Melvin C. Mayes
*Assistant Examiner* — Smita S Patel
(74) *Attorney, Agent, or Firm* — Rankin, Hill & Clark LLP

(57) ABSTRACT

A fuel reforming catalyst which contains an inorganic porous support, a catalytically active species, and catalyst particles including $CeO_2$ and $ZrO_2$ and in which the concentration of $ZrO_2$ in the catalyst particles is higher in the vicinity of the particle surface than in the particle interior and the concentration of $CeO_2$ in the catalyst particles is equal in the particle interior and in the vicinity of the particle surface is proposed for the purpose of providing a new fuel (Continued)

reforming catalyst which can effectively lower the concentration of the hydrocarbon of C2 or more in the gas which has passed through a steam reforming reaction.

7 Claims, 3 Drawing Sheets

(51) Int. Cl.
    *C01B 3/40*     (2006.01)
    *B01J 21/04*     (2006.01)
    *B01J 21/06*     (2006.01)
    *B01J 35/00*     (2006.01)
    *B01J 35/02*     (2006.01)
    *B01J 35/08*     (2006.01)
    *B01J 35/10*     (2006.01)
    *B01J 23/42*     (2006.01)
    *B01J 23/46*     (2006.01)
    *B01J 32/00*     (2006.01)
    *B01J 37/02*     (2006.01)

(52) U.S. Cl.
    CPC ............ *B01J 23/462* (2013.01); *B01J 23/63* (2013.01); *B01J 32/00* (2013.01); *B01J 35/002* (2013.01); *B01J 35/0026* (2013.01); *B01J 35/023* (2013.01); *B01J 35/08* (2013.01); *B01J 35/1019* (2013.01); *B01J 35/1038* (2013.01); *B01J 37/0205* (2013.01); *C01B 3/40* (2013.01); *B01J 35/0006* (2013.01); *B01J 2523/00* (2013.01); *C01B 2203/0233* (2013.01); *C01B 2203/1064* (2013.01); *Y02P 20/52* (2015.11)

(58) Field of Classification Search
    CPC  B01J 35/1019; B01J 35/1038; B01J 2523/00; B01J 2523/31; B01J 2523/3712; B01J 2523/48; B01J 2523/821; B01J 37/00; B01J 37/02; B01J 37/08; B01J 37/34
    See application file for complete search history.

(56) References Cited

U.S. PATENT DOCUMENTS

| | | |
|---|---|---|
| 2007/0172416 A1 | 7/2007 | Kawashima et al. |
| 2007/0254805 A1 | 11/2007 | Feaviour et al. |
| 2008/0219918 A1 | 9/2008 | Lee |
| 2010/0172826 A1 | 7/2010 | Kawashima et al. |
| 2011/0114892 A1 | 5/2011 | Jun et al. |
| 2012/0329645 A1 | 12/2012 | Skjoth-Rasmussen et al. |
| 2013/0281289 A1 | 10/2013 | Forrest et al. |
| 2015/0080212 A1 | 3/2015 | Skjoth-Rasmussen et al. |
| 2016/0375426 A1 | 12/2016 | Forrest et al. |

FOREIGN PATENT DOCUMENTS

| | | |
|---|---|---|
| CN | 102513105 A | 6/2012 |
| CN | 103068723 A | 4/2013 |
| CN | 103189136 A | 7/2013 |
| JP | 05220397 | 8/1993 |
| JP | 5261286 A2 | 10/1993 |
| JP | 200324783 | 1/2003 |
| JP | 2003245554 A2 | 9/2003 |
| JP | 2003320253 A2 | 11/2003 |
| JP | 2004322001 A2 | 11/2004 |
| JP | 2006247451 A2 | 9/2006 |
| JP | 2007516825 | 6/2007 |
| JP | 2009254929 A2 | 11/2009 |
| JP | 2010207782 A2 | 9/2010 |
| JP | 2011218320 A2 | 11/2011 |
| JP | 2011529394 | 12/2011 |

OTHER PUBLICATIONS

Zhu Hongfa and Liu Lizhi, "Technology of Preparation and Application of Catalysts," pp. 123-127, 2011 and its English translation.
Chinese Office Action dated Jul. 3, 2017 issued in the corresponding Chinese patent application No. 201480074801.0.
International Search Report dated Feb. 24, 2015 filed in PCT/JP2014/080638.

* cited by examiner

[FIG. 1]
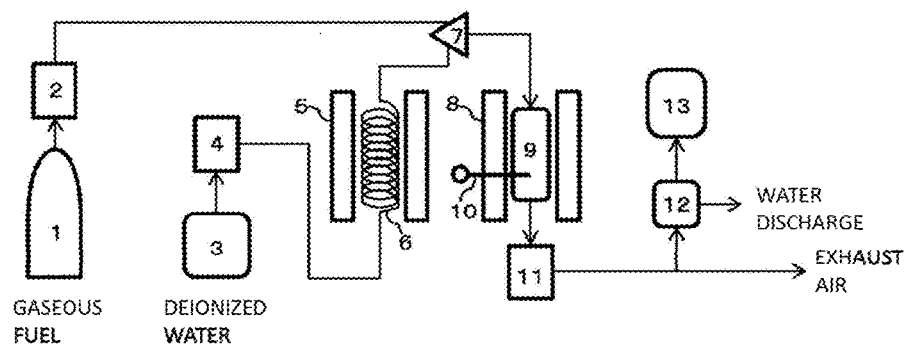
GASEOUS FUEL   DEIONIZED WATER
WATER DISCHARGE
EXHAUST AIR
[FIG. 2]
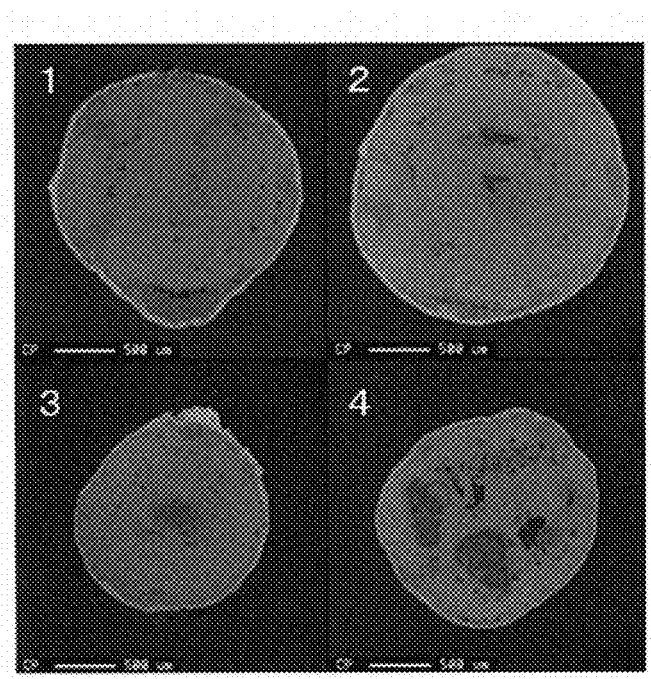

[FIG. 3]
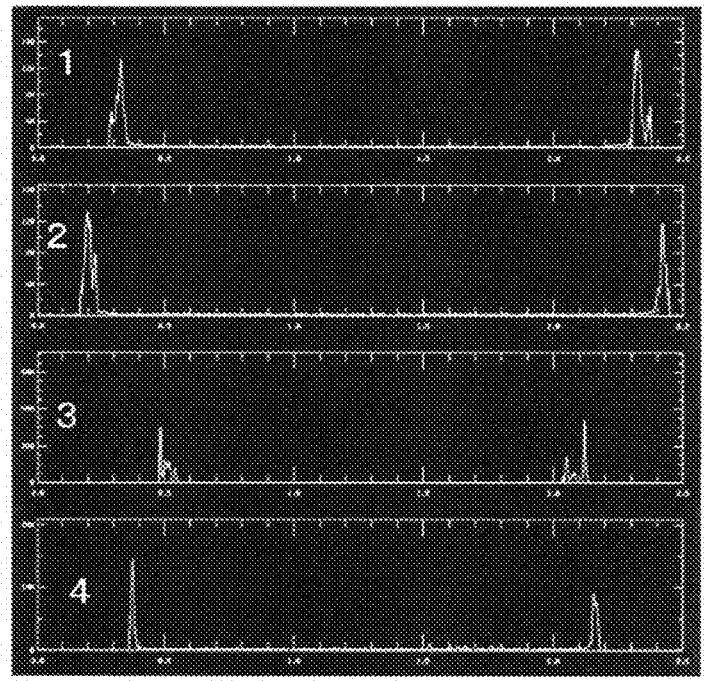
[FIG. 4]
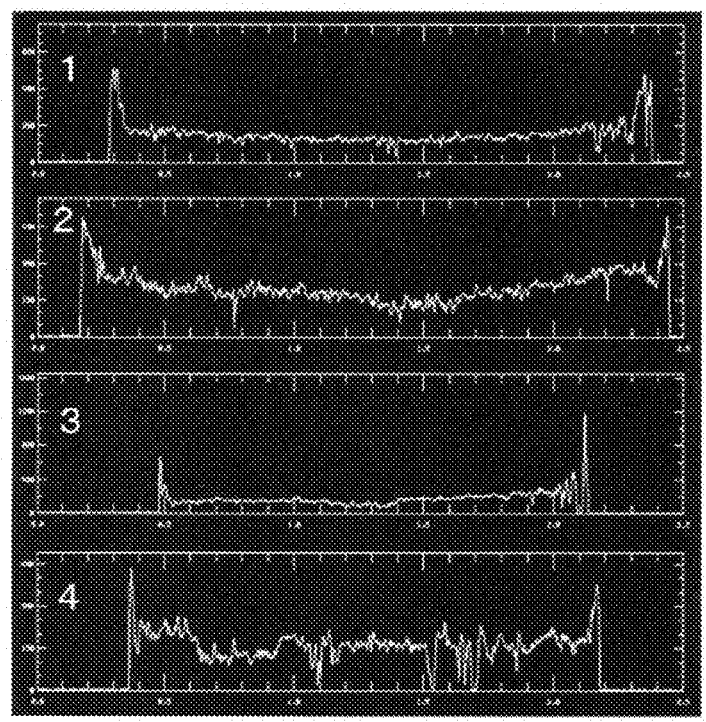

[FIG. 5]
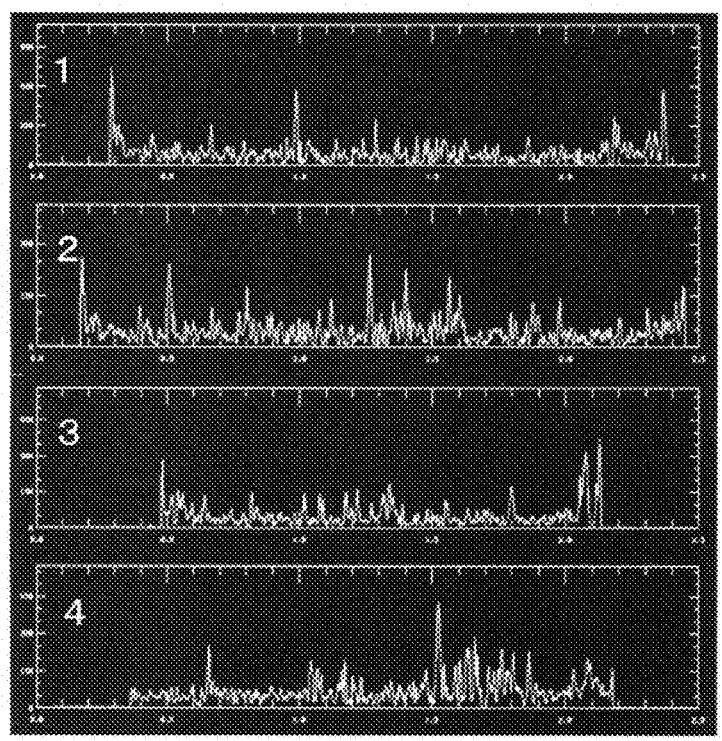

FUEL REFORMING CATALYST

TECHNICAL FIELD

A present invention relates to a fuel reforming catalyst which can promote a steam reforming reaction to obtain hydrogen by reforming fuel gas containing a hydrocarbon.

BACKGROUND ART

A fuel cell is a cell that converts chemical energy into electrical energy through the electrochemically reaction between hydrogen and oxygen, and hydrogen obtained by reforming city gas and the like is utilized as the hydrogen source.

In the steam reforming reaction to obtain hydrogen by reforming city gas and the like, a reaction to produce hydrogen ($H_2$) by adding steam to a hydrocarbon (CnHm) that is the main component of city gas and by chemically reacting them as described in the following Formula (1) using a fuel reforming catalyst proceeds as the main reaction. In addition, carbon monoxide (CO) obtained by the reaction of Formula (1) is bonded to a great amount of steam so that a reaction to produce hydrogen through a water-gas shift reaction further proceeds (see Formula (2)).

$$C_nH_m + nH_2O \rightarrow nCO + (m/2+n)H_2 \quad (1)$$

$$CO + H_2O \rightarrow CO_2 + H_2 \quad (2)$$

As the reforming catalyst used in such a steam reforming reaction, for example, a steam reforming catalyst of a hydrocarbon obtained by supporting zirconium oxide produced from zirconia sol as a precursor and a ruthenium component on aluminum oxide containing alkaline earth metal aluminate is disclosed (Patent Document 1).

In Patent Document 2, a hydrogen producing catalyst obtained by supporting a catalytically active species on a support containing a composite oxide powder that is formed by dispersing both ceria and alumina in a nm scale is disclosed as a catalyst for producing hydrogen from a gas containing a hydrocarbon, oxygen, and steam.

In addition, in Patent Document 3, a hydrogen producing catalyst obtained by supporting a catalytically active species on a support containing a composite oxide that is formed by dispersing ceria and zirconia in a nano-scale is disclosed as a catalyst for producing hydrogen from a gas containing a hydrocarbon.

In Patent Document 4, a fuel reforming catalyst in which at least one active component selected from the group consisting of ruthenium and rhodium is supported on a support containing a first oxide of cerium oxide and at least one second oxide selected from the group consisting of aluminum oxide and zirconium oxide is disclosed.

In Patent Document 5, a reforming catalyst for producing hydrogen is disclosed which is a steam reforming catalyst formed by containing a precious metal component including at least one species of ruthenium, rhodium, or platinum and a rare earth metal in an alumina support and in which the product of the content (% by mass) of the precious metal component contained in the catalyst with the dispersity (%) of the precious metal component is 100 or more and the dispersity (%) of the precious metal component is 70% or less.

In Patent Document 6, a steam reforming catalyst is disclosed which contains a support containing a composite oxide in which both of ceria and alumina are dispersed in a nano-scale and at least one species of metal element which is supported on the support and belongs to the group 8 to the group 10 in the long form periodic table.

In Patent Document 7, a fuel reforming catalyst is disclosed which is a fuel reforming catalyst formed by supporting a precious metal catalyst on a support composed of γ-alumina and in which cerium oxide of 5 to 30% by mass of the support is supported on the support.

CITATION LIST

Patent Document

Patent Document 1: JP 5-220397 A
Patent Document 2: JP 2003-24783 A
Patent Document 3: JP 2003-245554 A
Patent Document 4: JP 2006-247451 A (JP 4738024 B1)
Patent Document 5: JP 2009-254929 A
Patent Document 6: JP 2010-207782 A
Patent Document 7: JP 2011-218320 A

SUMMARY OF THE INVENTION

Problem to be Solved by the Invention

In the case of reforming the fuel gas containing a hydrocarbon using a fuel reforming catalyst, the catalyst performance of the fuel reforming catalyst deteriorates time-dependently. In particular, in the case of using a gas containing a great amount of a hydrocarbon having 2 or more carbon atoms (referred to as the "hydrocarbon of C2 or more") such as ethane, propane, or butane as a fuel source, a phenomenon (coking) in which carbon produced through the thermal decomposition of the hydrocarbon in the fuel gas is deposited on the catalyst is caused and thus the performance of the catalyst deteriorates.

Accordingly, an object of the invention is to provide a new fuel reforming catalyst which can effectively lower the concentration of the hydrocarbon of C2 or more in the gas which has passed through a steam reforming reaction.

Means for Solving Problem

The invention proposes a fuel reforming catalyst which contains an inorganic porous support, a catalytically active species, and catalyst particles including $CeO_2$ and $ZrO_2$ and in which the concentration of $ZrO_2$ in the catalyst particles is higher in the vicinity of the particle surface than in the particle interior and the concentration of $CeO_2$ in the catalyst particles is equal in the particle interior and in the vicinity of the particle surface.

Effect of the Invention

Hitherto, it has been mentioned that it is important to increase the entire concentration of the promotors in the vicinity of the inorganic porous support surface in order to enhance the reactivity on the surface of the inorganic porous support. However, in the invention, the catalyst is prepared such that the concentration of $ZrO_2$ of a promotor is higher in the vicinity of the particle surface than in the particle interior and the concentration of $CeO_2$ of another promotor is equal in the particle interior and in the vicinity of the particle surface, and as a result, it is possible to promote the reaction through which a hydrocarbon having a greater number of carbon atoms is decomposed to a hydrocarbon having a smaller number of carbon atoms and to effectively lower the concentration of the hydrocarbon of C2 or more in the gas which has passed through a steam reforming reaction.

BRIEF DESCRIPTION OF DRAWINGS

FIG. 1 is a block flow diagram illustrating the outline of an apparatus for evaluating fuel reforming used in the test for evaluating gas reforming of Example;

FIG. 2 is a composition image (COMPO image) obtained by randomly acquiring four catalyst particles obtained in Example 3 and observing the cross section thereof using a scanning electron microscope (SEM). In addition, the numbers described in FIG. 2 correspond to the numbers described in the mapping data illustrated in the respective following FIG. 3, FIG. 4, and FIG. 5;

FIG. 3 is a diagram illustrating the mapping data when the concentration of $ZrO_2$ (promotor) in each depth is measured as the count number of $L\alpha$ line of Zr by conducting line analysis of the cross section of the catalyst particles obtained in Example 3 in a range of from the surface side to the surface on the opposite side via the interior of the particle using an electron probe micro analyzer (EPMA);

FIG. 4 is a diagram illustrating the mapping data when the concentration of $CeO_2$ (promotor) in each depth is measured as the count number of $L\alpha$ line of Ce by conducting line analysis of the cross section of the catalyst particles obtained in Example 3 using an electron probe micro analyzer (EPMA); and FIG. 5 is a diagram illustrating the mapping data when the concentration of Ru (catalytically active species) in each depth is measured as the count number of $L\alpha$ line of Ru by conducting line analysis of the cross section of the catalyst particles obtained in Example 3 using an electron probe micro analyzer (EPMA).

MODES FOR CARRYING OUT THE INVENTION

Next, the invention will now be described with reference to embodiments. However, the invention is not limited to the embodiments to be described below.

<Present Fuel Reforming Catalyst>

The fuel reforming catalyst (hereinafter, referred to as the "present fuel reforming catalyst") according to an example of the present embodiment is a fuel reforming catalyst which contains an inorganic porous support, a catalytically active species, and catalyst particles (hereinafter, referred to as the "present catalyst particles") containing $CeO_2$ and $ZrO_2$, and as a preferred example, it is a fuel reforming catalyst which contains the present catalyst particles having a configuration formed by supporting a catalytically active species, $CeO_2$, and $ZrO_2$ on an inorganic porous support.

The present fuel reforming catalyst may contain other components since it is only desired to contain the present catalyst particles. However, it is preferable that the present catalyst particles accounts for 70% by mass or more in the present fuel reforming catalyst, 90% by mass or more among them, and 95% by mass or more (including 100% by mass) among them.

Examples of other components other than the present catalyst particles may include a component containing $SiO_2$, $TiO_2$, $ZrO_2$, $CeO_2$, and the like as the inorganic porous material. However, it is not limited to these.

<Present Catalyst Particles>

The present catalyst particles are catalyst particles which contain an inorganic porous support, a catalytically active species, $CeO_2$, and $ZrO_2$, and a preferred example is catalyst particles having a configuration formed by supporting a catalytically active species, $CeO_2$, and $ZrO_2$ on an inorganic porous support. In addition, it is preferable that the concentration of $ZrO_2$ in the catalyst particles is higher in the vicinity of the particle surface than in the particle interior and the concentration of $CeO_2$ in the catalyst particles is equal in the particle interior and in the vicinity of the particle surface.

(Inorganic Porous Support)

The inorganic porous support of the support in the present catalyst particles may be one that is composed of, for example, alumina, silica, silica alumina, cordierite, stainless steel, or the like.

It is preferable to contain alumina among them, and $\gamma$-$Al_2O_3$ among them. At this time, the inorganic porous support is particularly preferably an inorganic porous support in which $\gamma$-$Al_2O_3$ accounts for 80% by mass or more thereof, 90% by mass or more among them, and 99% by mass or more (including 100% by mass) among them.

Examples of the shape of the inorganic porous support may include a spherical shape, a cylindrical shape, a bead shape, a pellet shape, a prismatic shape, a tablet shape, a needle shape, a film shape, and a honeycomb monolith shape. It is preferably a bead shape, a pellet shape, or a honeycomb monolith shape among them.

Hence, the inorganic porous support is particularly preferably one that is composed of alumina, silica, silica alumina, cordierite, or stainless steel and of which the shape is a bead shape, a pellet shape, or a honeycomb monolith shape.

The average size of the inorganic porous support having a bead shape or a pellet shape is preferably 0.5 mm or more and 10 mm or less from the viewpoint of handling or the fluidity in a container, and it is particularly preferably 0.7 mm or more or 5 mm or less among them and 1 mm or more or 3 mm or less among them.

Meanwhile, the average size (diameter) of the inorganic porous support having a spherical shape is preferably 1 mm or more and 10 mm or less from the viewpoint of handling or the fluidity in a container, and it is more preferably 1 mm or more or 5 mm or less among them.

Incidentally, the average size of the inorganic porous support having a bead shape or a pellet shape can be determined by observing the present fuel reforming catalyst through an optical microscope or the like, randomly measuring the longer size and the shorter size of 100 inorganic porous supports, determining the average size of each support, and further calculating the average size of these 100 supports.

The average size of the inorganic porous support having a spherical shape can also be determined by observing the present fuel reforming catalyst through an optical microscope or the like, randomly measuring the diameter of 100 inorganic porous supports, determining the average size of each support, and further calculating the average size of these 100 supports in the same manner as the above.

The average pore size of the inorganic porous support is preferably 0.5 nm or more and 100 nm or less, from the viewpoint of the diffusion of the fuel gas and the contact thereof with the catalyst, namely, that the reaction hardly proceeds as the contact number with the catalyst decreases when the average pore size is too large and the reaction also hardly proceeds as the fuel gas is hardly diffused when it is too small, it is particularly preferably 1 nm or more or 50 nm or less among them and 2 nm or more or 10 nm or less among them.

Incidentally, this average pore size can be determined by randomly measuring the pore size of 10 inorganic porous supports using a nitrogen adsorption-type pore distribution analyzer and further calculating the average value of these 10 supports.

(Promotor)

It is important that the present fuel reforming catalyst contains at least $CeO_2$ and $ZrO_2$ as the promotor.

In the present catalyst particles, $CeO_2$ and $ZrO_2$ are present as an oxide of each of them, but a part of them may be a solid solution.

In the present catalyst particles, it is preferable that the concentration of $ZrO_2$ is higher in the vicinity of the particle surface than in the particle interior and the concentration of $CeO_2$ in the catalyst particles is equal in the particle interior and in the vicinity of the particle surface.

At this time, it can be confirmed that the concentration of $ZrO_2$ in the present catalyst particles is higher in the vicinity of the particle surface than in the particle interior by observing that $ZrO_2$ is concentrated in the vicinity of the particle surface, for example, when the present catalyst particles are observed by EDX. In addition, quantitatively, it can be judged, for example, by the count number of $L\alpha$ line when line analysis using an electron probe micro analyzer (EPMA) is conducted or the count number of the X-ray excited when mapping is conducted by EDX. For example, it can be judged that the concentration of $ZrO_2$ is higher in the vicinity of the particle surface when C/D is 5.5 or more where C denotes the average value of count numbers in a range of up to 10% of the particle size from the particle surface towards the particle center and D denotes the average value of count numbers in a range of up to 25% of the particle size from the particle center towards the particle surface when the concentration of $ZrO_2$ in each depth of the present catalyst particles is measured as the count number of $L\alpha$ line by conducting line analysis using an EPMA.

Meanwhile, it can be confirmed that the concentration of $CeO_2$ in the present catalyst particles is equal in the particle interior and in the vicinity of the particle surface by observing that $CeO_2$ is not biased in the vicinity of the particle surface but is uniformly dispersed, for example, when the present catalyst particles are observed by EDX. In addition, specifically, it can be judged, for example, by the count number of $L\alpha$ line when line analysis using an EPMA is conducted or the count number of the X-ray excited when mapping is conducted by EDX. For example, it can be judged that the concentration of $CeO_2$ is equal in the particle interior and in the vicinity of the particle surface when the ratio of A/B is 0.5 or more and less than 5.5 where A denotes the average value of count numbers in a range of up to 10% of the particle size from the particle surface towards the particle center and B denotes the average value of count numbers in a range of up to 25% of the particle size from the particle center towards the particle surface when the concentration of $CeO_2$ in each depth of the present catalyst particles is measured as the count number of $L\alpha$ line by conducting line analysis using an EPMA.

In the present catalyst particles, with regard to the concentration of $ZrO_2$, the ratio of the average concentration in a range of up to 10% of the particle size from the particle surface towards the particle center to the average concentration in a range of up to 25% of the particle size from the particle center towards the particle surface is preferably 5.5 or more and 18 or less, 5.8 or more or 17 or less among them, and 7 or more or 16 or less among them.

Meanwhile, with regard to the $CeO_2$, the ratio of the average concentration in a range of up to 10% of the particle size from the particle surface towards the particle center to the average concentration in a range of up to 25% of the particle size from the particle center towards the particle surface is preferably 0.5 or more and less than 5.5, 1 or more or less than 5.5 among them, and 1 or more or 3 or less among them.

In the present catalyst particles, it is more preferable that the ratio of A/B is 0.5 or more or less than 5.5 and 0.5 or more or 3.0 or less among them where A denotes the average value of count numbers in a range of up to 10% of the particle size from the particle surface towards the particle center and B denotes the average value of count numbers in a range of up to 25% of the particle size from the particle center towards the particle surface when the concentration of $CeO_2$ in each depth of the present catalyst particles is measured as a count number of $L\alpha$ line by conducting line analysis using an electron probe micro analyzer (EPMA).

In addition, it is even more preferable that C/D is 5.5 or more and 18 or less, 8 or more or 18 or less among them, 11 or more or 18 or less among them where C denotes the average value of count numbers in a range of up to 10% of the particle size from the particle surface towards the particle center and D denotes the average value of count numbers in a range of up to 25% of the particle size from the particle center towards the particle surface when the concentration of $ZrO_2$ in each depth of the present catalyst particles is measured as the count number of $L\alpha$ line by conducting line analysis using an EPMA in the same manner as the above.

In the present fuel reforming catalyst, the ratio of the entire content of $CeO_2$ to the entire content 1 of $ZrO_2$ measured by an inductively coupled plasma (ICP) method is preferably 35 or less, and it is particularly preferably 1 or more or 25 or less among them and 1.5 or more or 17 or less among them.

In addition, in the present fuel reforming catalyst, the sum of the entire content of $ZrO_2$ and the entire content of $CeO_2$ measured by an inductively coupled plasma (ICP) method preferably accounts for 3 wt % or more and 32 wt % or less of the entire catalyst mass, it particularly preferably accounts for 5 wt % or more or 25 wt % or less among them and 7 wt % or more or 20 wt % or less among them.

(Catalytically Active Species)

The catalytically active species is preferably a precious metal belonging to the platinum group. Examples thereof may include ruthenium (Ru), rhodium (Rh), palladium (Pd), osmium (Os), iridium (Ir), and platinum (Pt), and it is preferable to contain one species or two or more species of these as the catalytically active species. It is particularly preferable to contain Ru among them.

The amount of the catalytically active species supported is preferably 1.0 wt % or more and 5.0 wt % or less of the total amount of the catalyst, and it is preferably 1.5 wt % or more or 3.0 wt % or less among them. The hydrogen production activity deteriorates when the supported amount is less than this, and the grain growth of the catalytically active species is likely to occur as well as the hydrogen production activity is saturated even when the catalytically active species is supported more than this.

In addition, it is preferable that the concentration of the catalytically active species in the catalyst particles is equal in the particle interior and in the vicinity of the particle surface.

When this feature is expressed as a numerical number, the ratio of E/F is preferably 0.5 or more and 6.5 or less and it is particularly preferably 0.7 or more or 5.5 or less among them where E denotes the average value of count numbers in a range of up to 10% of the particle size from the particle surface towards the particle center and F denotes the average value of count numbers in a range of up to 25% of the particle size from the particle center towards the particle surface when the concentration of the element in each depth of the catalyst particles is measured as the count number of Lα line by conducting line analysis using an electron probe micro analyzer (EPMA).

(Other Components)

The present catalyst particles may contain other components in addition to the catalytically active component and the promoting component. For example, it is possible to contain $Fe_2O_3$, $SiO_2$, $Na_2O$, $La_2O_3$, $BaCO_3$, and the like as known to improve the heat resistance of the support.

<Producing Method>

In the production of the present fuel reforming catalyst, as the method to support the catalytically active species, $ZrO_2$, and $CeO_2$ on the inorganic porous material, a known impregnation method can be used.

However, it is possible to employ the following method in order to set the concentration of $ZrO_2$ to be higher in the vicinity of the particle surface than in the particle interior and the concentration of $CeO_2$ to be equal in the particle interior and in the vicinity of the particle surface. However, it is not limited to this method.

In other words, the promotor is often supported on the surface in a more amount when the promotor is supported on the inorganic porous material by a general spray drying method, and thus it is preferable to support Ce so as to have an equal concentration up to the interior of the inorganic porous material, for example, by thinning the concentration of the aqueous solution containing a Ce ion and impregnating the inorganic porous material in the aqueous solution plural times. However, it is not limited to such a method.

Meanwhile, with regard to $ZrO_2$, it may be supported as usual. For example, $ZrO_2$ may be supported by preparing an aqueous solution containing a Zr ion and impregnating the inorganic porous material in the aqueous solution one time or two times.

Examples of the raw material containing Ce may include cerium nitrate, examples of the raw material containing Zr may include zirconium oxynitrate, and examples of the raw material containing Ru may include a ruthenium nitrate solution. However, they are not limited to these.

It is possible to support ceria ($CeO_2$) and zirconia ($ZrO_2$) on the inorganic porous material by repeatedly absorbing the thinned Ce ion-containing solution to the inorganic porous material and drying it and then absorbing the Zr ion-containing solution and drying it in this manner, and then for example, calcining the inorganic porous material in an air atmosphere at 400° C. or higher and 800° C. or lower for about 1 hour or longer and 10 hours or shorter.

Thereafter, it is possible to support the catalyst active species on the inorganic porous material by significantly thinning the concentration of the solution containing the catalytically active species and impregnating the inorganic porous material into the slurry plural times to support the catalytically active species on the inorganic porous material at an equal concentration up to the interior thereof in the same manner as in the supporting of ceria ($CeO_2$), and then, for example, calcining the inorganic porous material in an air atmosphere at 300° C. or higher and 600° C. or lower for about 1 hour or longer and 10 hours or shorter.

<Application>

The present fuel reforming catalyst can also be used as a single catalyst as it is. In addition, it can also be molded into an appropriate shape such as a pellet or bead shape and then used as a single catalyst. Furthermore, it can also be used by being supported on a substrate formed of a ceramic or metallic material.

Moreover, it can be used as a catalyst in various apparatuses for the steam reforming reaction. For example, it can be used in a hydrogen plant in an oil refinery and the like or in hydrogen producing apparatus for fuel cell in the stationary distributed power source.

(Substrate)

Examples of the material for the substrate to support the present catalyst particles may include a refractory material such as a ceramic or a metallic material such as ferritic stainless steel.

Examples of the ceramic substrate may include a refractory ceramic material, for example, those that contain cordierite, cordierite-α-alumina, silicon nitride, zircon mullite, alumina-silica magnesia, zircon silicate, sillimanite, magnesium silicate, zircon, petalite, α-alumina, and an aluminosilicate as a main material.

Examples of the metal substrate may include a refractory metal, for example, those that contain other proper corrosion resistant alloys having stainless steel or iron as the base, and the like as a main material.

Examples of the shape of the substrate may include a honeycomb shape, a pellet shape, and a spherical shape.

For example, a method may be mentioned in which the present fuel reforming catalyst is mixed and stirred with a binder and water to prepare a slurry, the slurry thus obtained is wash-coated, for example, on a substrate such as a ceramic honeycomb body, and this is calcined, thereby forming a catalyst layer on the substrate surface.

In addition, a method may also be mentioned in which the present fuel reforming catalyst is mixed and stirred with a binder and water if necessary to prepare a slurry, the slurry thus obtained is wash-coated, for example, on a substrate such as a ceramic honeycomb body to form a catalyst support layer, and then this is immersed in a solution containing the catalytically active component to adsorb the catalytically active component on the catalyst support layer, and this is calcined, thereby forming a catalyst layer on the substrate surface.

In addition, a method may also be mentioned in which the present fuel reforming catalyst is mixed and stirred with a binder and water if necessary to prepare a slurry, the slurry thus obtained is coated on a substrate, and this is calcined, thereby forming a catalyst layer on the substrate surface.

Incidentally, as the method for producing the present catalyst, it is possible to employ any known method, and it is not limited to the examples described above.

The catalyst layer may be a single layer or a multilayer consisting of two or more layers in any of the producing methods.

<Description of Phrase>

In the present specification, in a case in which it is expressed by the term "X or more" (X is an arbitrary number) or "Y or less" (Y is an arbitrary number), it also includes the meaning of the intent that it is "preferably greater than X" or "preferably less than Y".

EXAMPLES

Hereinafter, the invention will be described in more detail on the basis of the following Examples and Comparative Examples.

Examples 1 to 13 and Comparative Example 1

A dry alumina pellet is obtained by leaving 100 g of γ-alumina (SSA: about 190 $m^2$/g, pore volume: about 0.43 cc/g, packing density: about 0.85 g/cc, and average size: 2 mm) having a spherical pellet shape to still stand in an environment at 150° C. for 2 hours so as to be dried.

Cerium nitrate was weighed so as to be the supported amount presented in the following Table 1 in terms of oxide, and the cerium nitrate was introduced into hot water (90° C.) to be 200% of the amount of water supply of 100 g of the dry alumina pellets and dissolved by stirring the mixture, thereby obtaining a cerium nitrate solution. Thereafter, 100 g of the dry alumina pellet was introduced into the solution, and the mixture was stirred for 10 minutes, and dried with hot air at 150° C. until the resultant is completely dried, thereby obtaining a cerium-supporting dry alumina pellet.

The cerium-supporting dry alumina pellet obtained in this manner was calcined at 600° C. for 5 hours, thereby obtaining a cerium-supporting calcined alumina pellet. The ceria-supporting calcined alumina pellets thus obtained was introduced into the cerium nitrate solution, dried with hot air at 150° C. until the resultant is completely dried, and then calcined at 600° C. for 5 hours, thereby obtaining a sample having the intended amount of ceria supported.

Subsequently, a ceria-zirconia-supporting calcined alumina pellet was obtained by supporting zirconium oxynitrate on the sample by the same method as in the ceria supporting step, drying the resultant with hot air at 150° C. until the resultant is completely dried, and then calcining the resultant at 600° C. for 5 hours.

Examples 1 to 12 and Comparative Example 1

A commercially available 5 wt % Ru nitrate solution was weighed such that the amount of Ru metal in the entire catalyst became the supported amount presented in the following Table 1, the ceria-zirconia-supporting calcined alumina pellet was introduced into this Ru nitrate solution, and the mixture was stirred for 10 minutes, left to still stand in an environment at 80° C. or higher and lower than 100° C. for 10 hours or longer, and then calcined at 500° C. for 2 hours, thereby obtaining a ceria-zirconia-Ru-supporting calcined alumina pellet (sample).

Example 13

Into a commercially available Ru nitrate solution, 1 N aqueous ammonia was added until pH reached 7.5, thereby preparing a slurry containing ruthenium hydroxide in black. Subsequently, it was weighed such that the amount of Ru metal in the entire catalyst became the supported amount presented in the following Table 1, the ceria-zirconia-supporting calcined alumina pellet was introduced into this slurry, and the mixture was stirred for 10 minutes, sufficiently dried at 120° C. for 12 hours, and then calcined at 700° C. for 24 hours, thereby obtaining a ceria-zirconia-Ru-supporting calcined alumina pellet (sample).

TABLE 1

|  | Ru wt % | CeO$_2$ wt % | ZrO$_2$ wt % |
| --- | --- | --- | --- |
| Example 1 | 2.5 | 3.0 | 0.4 |
| Example 2 | 2.5 | 7.5 | 1.0 |
| Example 3 | 2.5 | 10.5 | 1.4 |
| Example 4 | 2.5 | 16.0 | 2.2 |
| Example 5 | 2.5 | 21.5 | 2.9 |
| Example 6 | 2.5 | 27.0 | 3.6 |
| Example 7 | 2.5 | 11.6 | 0.4 |
| Example 8 | 2.5 | 11.2 | 0.8 |
| Example 9 | 2.5 | 9.5 | 2.5 |
| Example 10 | 2.5 | 8.0 | 4.0 |
| Example 11 | 2.5 | 7.2 | 4.8 |
| Example 12 | 2.5 | 32.0 | 4.3 |
| Example 13 | 2.0 | 11.0 | 1.3 |
| Comparative Example 1 | 2.0 | 11.0 | 1.3 |

(Method for Measuring Content of Each Element)

The content of each element was measured by ICP analysis.

(Method for Analyzing Element Concentration in Each Depth)

The concentrations of ZrO$_2$ (promotor), CeO$_2$ (promotor), and Ru (catalytically active species) in each depth on the cross section of the catalyst particles obtained in each Example were measured as the count numbers using an electron probe micro analyzer (EPMA) under the measurement conditions presented in Table 2.

TABLE 2

| Apparatus | Model JXA 8800 manufactured by JEOL Ltd. |
| --- | --- |
| Acceleration voltage | 15 kV |
| Probe current | 50 nA |
| Measured point numbers/size/counting time per one point | 2501 points/2.5 mm |
| Analyzing crystal (detected line) |  |
| Ce | LiF (Lα) |
| Zr | PET (Lα) |
| Ru | PET (Lα) |

(Method for Measuring C2 or More Concentration)

The C2 or more concentration obtained in each Example was measured using an apparatus for evaluating fuel reforming illustrated in FIG. 1.

This apparatus for evaluating fuel reforming is one that can control the flow rate of city gas supplied from a cylinder as a gas fuel 1 and deionized water contained in a deionized water tank 3 by a gas mass flow controller-2 and a liquid mass flow controller-4, respectively. Deionized water becomes steam by passing through a vaporizer 6 in an electric furnace 5, is mixed with the gaseous fuel in a fuel gas/steam mixing unit 7, is sent to a reforming catalyst 9 that is sealed in a stainless steel container in an electric furnace 8, and the gas that has been reformed by the reforming catalyst 9 is exhausted through a bubbler-11.

A part of this exhaust gas is sucked into the pump installed in a gas chromatography (hereinafter, referred to as the "GC") 13, and the reformed gas which has passed through a moisture remover 12 is quantified by the GC 13. At this time, the sum of the concentrations of ethane, propane, i-butane, and n-butane with respect to the entire amount of gas was defined as the C2 or more concentration to be evaluated.

(Test for Evaluating Gas Reforming)

The amount of the reforming catalyst in the reformer was set to be an amount so as to have a volume of 5 cc, and the electric furnace 8 was controlled to 550° C. according to the temperature value measured using a thermocouple 10.

The ratio (hereinafter, referred to as the "S/C ratio") of the molar amount of steam to be supplied to the molar amount of the entire carbon amount in the fuel gas was set to 2.5, and the C2 or more concentration when 30 minutes elapsed after the thermocouple 10 indicated 550° C. was adopted as the Fresh value. The S/C ratio was increased to 4.0 and the temperature was raised to 750° C. after the Fresh value was measured, the S/C ratio was decreased again to 2.5 and the temperature was lowered again to 550° C. when 1 hour and 30 minutes elapsed thereafter, and the C2 or more concentration when 10 minutes elapsed thereafter was adopted as the Aged value.

Incidentally, the flow rate was controlled such that the space velocity (SV) obtained by dividing the flow rate of fuel gas by the catalyst volume became about 9000 $h^{-1}$.

TABLE 3

|  | Ru wt % | $CeO_2$ wt % | $ZrO_2$ wt % | C + Z wt % | C/Z — | Fresh % | Aged % | A/B — | C/D — | E/F — |
|---|---|---|---|---|---|---|---|---|---|---|
| Example 1 | 2.48 | 3.02 | 0.41 | 3.43 | 7.4 | 0.0404 | 0.0641 | 1.2 | 7.5 | 1.7 |
| Example 2 | 2.49 | 6.43 | 0.86 | 7.29 | 7.5 | 0.0156 | 0.0223 | 1.4 | 11.7 | 2.0 |
| Example 3 | 2.51 | 9.95 | 1.37 | 11.32 | 7.3 | 0.0035 | 0.0145 | 1.4 | 17.2 | 1.9 |
| Example 4 | 2.49 | 16.11 | 2.21 | 18.32 | 7.3 | 0.0131 | 0.0158 | 1.5 | 16.6 | 2.5 |
| Example 5 | 2.50 | 20.37 | 2.88 | 23.25 | 7.1 | 0.0394 | 0.0671 | 2.1 | 14.6 | 3.4 |
| Example 6 | 2.49 | 26.86 | 3.61 | 30.47 | 7.4 | 0.0274 | 0.0701 | 5.1 | 15.9 | 3.8 |
| Example 7 | 2.50 | 10.81 | 0.33 | 11.14 | 32.8 | 0.0335 | 0.1123 | 1.4 | 5.8 | 1.7 |
| Example 8 | 2.48 | 10.38 | 0.66 | 11.04 | 15.7 | 0.0198 | 0.0459 | 1.5 | 11.3 | 1.6 |
| Example 9 | 2.48 | 8.53 | 2.53 | 11.06 | 3.4 | 0.0137 | 0.0198 | 1.6 | 16.8 | 2.0 |
| Example 10 | 2.49 | 7.68 | 3.49 | 11.17 | 2.2 | 0.0272 | 0.0315 | 1.5 | 16.8 | 0.8 |
| Example 11 | 2.49 | 6.83 | 4.41 | 11.24 | 1.5 | 0.0481 | 0.0529 | 1.4 | 17.8 | 1.9 |
| Example 12 | 2.01 | 10.60 | 1.26 | 11.86 | 8.4 | 0.0533 | 0.0774 | 1.5 | 17.3 | 1.4 |
| Example 13 | 2.01 | 11.00 | 1.27 | 12.40 | 8.8 | 0.1181 | 0.1603 | 1.4 | 17.2 | 6.1 |
| Comparative Example 1 | 2.50 | 31.09 | 4.32 | 35.41 | 7.2 | 0.1232 | 0.1863 | 6.8 | 18.2 | 3.9 |

The samples obtained in Examples and Comparative Example described above were observed by EDX, and in any of Examples, it was possible to confirm that the concentration of $ZrO_2$ was higher in the vicinity of the particle surface than in the particle interior and the concentration of $CeO_2$ was equal in the particle interior and in the vicinity of the particle surface. On the contrary, in Comparative Example 1, it was confirmed that the concentration of $CeO_2$ was particularly higher in the vicinity of the particle surface as compared to the particle interior.

In addition, it was confirmed that C/D was in a range of 5.5 or more and 18 or less where C denoted the average value of count numbers in a range of up to 10% of the particle size from the particle surface towards the particle center and D denoted the average value of count numbers in a range of up to 25% of the particle size from the particle center towards the particle surface when the concentration of $ZrO_2$ in the samples obtained in Examples 1 to 13 described above was measured as the count number of Lα line by conducting line analysis using an EPMA. On the other hand, C/D in Comparative Example 1 was out of the range.

Furthermore, it was confirmed that the ratio of A/B was in a range of 0.5 or more or less than 5.5 where A denoted the average value of count numbers in a range of up to 10% of the particle size from the particle surface towards the particle center and B denoted the average value of count numbers in a range of up to 25% of the particle size from the particle center towards the particle surface when the concentration of $CeO_2$ in the samples obtained in Examples 1 to 13 described above was measured as a count number of Lα line by conducting line analysis using an EPMA. On the other hand, A/B in Comparative Example 1 was out of the range.

From the results of Examples and Comparative Example described above and the results of various kinds of tests which the present inventors have been conducted so far, it has been found that it is possible to promote the reaction through which a hydrocarbon having a greater number of carbon atoms is decomposed to a hydrocarbon having a smaller number of carbon atoms and to effectively lower the concentration of the hydrocarbon of C2 or more in the gas which has passed through a steam reforming reaction by setting the concentration of $ZrO_2$ to be higher in the vicinity of the particle surface than in the particle interior and the concentration of $CeO_2$ to be equal in the particle interior and in the vicinity of the particle surface.

As The reason for that the concentration of hydrocarbon of C2 or more can effectively lower as described above, it is presumed that this is because it is possible to efficiently reform the hydrocarbon having a decreased number of carbon atoms into hydrogen in the particle interior in which the concentration of $ZrO_2$ is kept low as well as it is possible to promote the reaction through which a hydrocarbon having a relatively greater number of carbon atoms is decomposed to a hydrocarbon having a smaller number of carbon atoms on the particle surface having a higher concentration of $ZrO_2$.

EXPLANATIONS OF LETTERS OR NUMERALS

1 Gaseous fuel (city gas or the like)
2 Gas mass flow controller
3 Deionized water tank
4 Liquid mass flow controller
5 Electric furnace (fixed at 300° C.)
6 Vaporizer
7 Fuel gas/steam mixing unit
8 Electric furnace
9 Reforming catalyst
10 Thermocouple for measuring reforming catalyst temperature
11 Bubbler
12 Moisture remover
13 Gas chromatography

The invention claimed is:
1. A fuel reforming catalyst comprising an inorganic porous support, a catalytically active species, and catalyst particles including $CeO_2$ and $ZrO_2$,
   wherein count numbers of Lα lines of Zr in the catalyst particles, which are measured by conducting line analysis using an electron probe micro analyzer, satisfy the following relationship:

$5.5 \leq C/D \leq 18$, where C denotes an average value of count numbers of Lα lines of Zr in a range of up to 10% of a particle size in a diameter from a particle surface towards a particle center, and D denotes an average value of count numbers of Lα lines of Zr in a range of up to 25% of the particle size in the diameter from the particle center towards the particle surface, and count numbers of Lα lines of Ce in the catalyst particles, which are measured by conducting line analysis using the electron probe micro analyzer, satisfy the following relationship:

$0.5 \leq A/B < 5.5$, where A denotes an average value of count numbers of Lα lines of Ce in a range of up to 10% of the particle size in the diameter from the particle surface towards the particle center and B denotes an average value of count numbers of Lα lines of Ce in a range of up to 25% of the particle size in the diameter from the particle center towards the particle surface.

2. The fuel reforming catalyst according to claim 1, wherein a mass ratio of an entire content of $CeO_2$ to an entire content of $ZrO_2$ measured by an inductively coupled plasma method is 35 or less.

3. The fuel reforming catalyst according to claim 1, wherein a sum of an entire content of $ZrO_2$ and an entire content of $CeO_2$ measured by an inductively coupled plasma method accounts for 3 wt % or more and 32 wt % or less of an entire catalyst mass.

4. The fuel reforming catalyst according to claim 1, wherein count numbers of Lα lines of the catalytically active species in the catalyst particles, which are measured by conducting line analysis using the electron probe micro analyzer, satisfy the following relationship:

$0.5 \leq E/F \leq 6.5$, where E denotes an average value of count numbers of Lα lines of the catalytically active species in a range of up to 10% of the particle size in the diameter from the particle surface towards the particle center and F denotes an average value of count numbers of Lα lines of the catalytically active species in a range of up to 25% of the particle size in the diameter from the particle center towards the particle surface.

5. The fuel reforming catalyst according to claim 1, comprising at least one or more species of platinum-group elements as the catalytically active species.

6. The fuel reforming catalyst according to claim 1, comprising Ru as the catalytically active species.

7. The fuel reforming catalyst according to claim 1, wherein the inorganic porous support includes alumina, silica, silica alumina, cordierite, or stainless steel and a shape of the inorganic porous support is a bead shape, a pellet shape, or a honeycomb monolith shape.

* * * * *